(12) United States Patent
Tiwari et al.

(10) Patent No.: US 11,696,184 B2
(45) Date of Patent: Jul. 4, 2023

(54) QUALITY OF SERVICE MANAGER FOR NETWORK SLICES OF A NETWORK

(71) Applicant: Accenture Global Solutions Limited, Dublin (IE)

(72) Inventors: Sanjay Tiwari, Bengaluru (IN); Shantha Maheswari, Bangalore (IN); Badarayan Panigrahi, Bangalore (IN); Mathangi Sandilya, Bangalore (IN); Gaurav Khanduri, Sydney (AU); Shihab Ponnampadikkal Abdul Rahiman, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/908,135

(22) Filed: Jun. 22, 2020

(65) Prior Publication Data

US 2021/0352534 A1   Nov. 11, 2021

(30) Foreign Application Priority Data

May 6, 2020 (IN) .............................. 202041019279

(51) Int. Cl.
*H04W 28/24* (2009.01)
*H04L 41/5009* (2022.01)
(Continued)

(52) U.S. Cl.
CPC ......... *H04W 28/24* (2013.01); *H04L 41/5009* (2013.01); *H04L 41/5025* (2013.01);
(Continued)

(58) Field of Classification Search
None
See application file for complete search history.

(56) References Cited

U.S. PATENT DOCUMENTS

| | | |
|---|---|---|
| 2018/0077023 A1 | 3/2018 | Zhang |
| 2018/0123961 A1 | 5/2018 | Farmanbar et al. |

(Continued)

FOREIGN PATENT DOCUMENTS

| | | | | |
|---|---|---|---|---|
| CN | 107889169 A | | 4/2018 | |
| WO | WO-2018059268 A1 | * | 4/2018 | ............ H04W 28/16 |
| WO | WO-2019190527 A1 | * | 10/2019 | ......... H04L 41/0806 |

OTHER PUBLICATIONS

U.S. Appl. No. 62/940,886, filed Nov. 27, 2019, Akman (Year: 2019).*

(Continued)

*Primary Examiner* — Jay L Vogel
(74) *Attorney, Agent, or Firm* — Harrity & Harrity, LLP

(57) ABSTRACT

A device determines, from a network slice template associated with a network slice, a quality of service (QoS) profile for the network slice that includes performance metrics for corresponding QoS parameters associated with providing a service. The device monitors performance of the network slice in association with the QoS profile, and determines, based on the performance, that a performance indicator for a QoS parameter of the network slice is outside a threshold range of a performance metric. The device determines, based on the performance information and the QoS profile, a slice modification to the network slice template for the network slice, where the slice modification is configured to cause the performance indicator to be within the threshold range of the performance metric. The device causes a network slice orchestrator to update an instantiation of the network slice according to the slice modification and the network slice template.

20 Claims, 11 Drawing Sheets

(51) Int. Cl.
*H04L 41/5025* (2022.01)
*H04L 41/5041* (2022.01)
*H04W 24/08* (2009.01)
*H04W 24/02* (2009.01)

(52) U.S. Cl.
CPC ......... *H04L 41/5048* (2013.01); *H04W 24/02* (2013.01); *H04W 24/08* (2013.01)

(56) References Cited

U.S. PATENT DOCUMENTS

| | | | |
|---|---|---|---|
| 2018/0132138 A1 | 5/2018 | Senarath et al. | |
| 2018/0220276 A1 | 8/2018 | Senarath et al. | |
| 2018/0270073 A1* | 9/2018 | Senarath | H04M 15/46 |
| 2019/0123963 A1* | 4/2019 | Tang | H04W 4/70 |
| 2019/0260690 A1* | 8/2019 | Sun | H04L 47/2425 |
| 2019/0386878 A1 | 12/2019 | Chou et al. | |
| 2020/0008105 A1* | 1/2020 | Cui | H04L 47/783 |
| 2020/0044943 A1* | 2/2020 | Bor-Yaliniz | H04L 41/5012 |
| 2020/0154292 A1* | 5/2020 | Bor-Yaliniz | H04W 24/02 |
| 2020/0163011 A1* | 5/2020 | Xu | H04L 41/0893 |
| 2020/0178122 A1* | 6/2020 | Xu | H04W 72/087 |
| 2020/0367129 A1* | 11/2020 | Raheem | H04W 28/0268 |
| 2021/0075678 A1* | 3/2021 | Seetharaman | H04W 28/0268 |
| 2021/0112428 A1* | 4/2021 | Young | H04W 76/11 |
| 2021/0160153 A1* | 5/2021 | Akman | H04L 41/0823 |
| 2021/0274387 A1* | 9/2021 | Kousaridas | H04L 41/5035 |
| 2021/0337555 A1* | 10/2021 | Fan | H04W 28/24 |

OTHER PUBLICATIONS

Alex Galis, "Network Slicing A holistic architectural approach, orchestration and management with applicability in mobile and fixed networks and clouds", Nov. 5, 2018, 122 pages.

L. Geng et al., "Network Slicing Architecture", https://tools.ietf.org/id/draft-geng-netslices-architecture-01.html, Jun. 2, 2017, 17 pages.

"3rd Generation Partnership Project; Technical Specification Group Services and System Aspects; Telecommunication Management; Study on Management and Orchestration of Network Slicing for Next Generation Network(Release 15)," 3GPP Standard; Technical Report; 3gpp Tr28.801, 3rd Generation Partnership Project(3gpp), Mobile Competence Centre ; 650,route Des Lucioles ; F-06921Sophia-Antipolis Cedex ; France, Jan. 2018 , vol. SA WG5, No. V15.1.0, pp. 1-75.

Extended European Search Report for Application No. 21168646.4, dated Sep. 3, 2021, 11 pages.

* cited by examiner

QUALITY OF SERVICE MANAGER FOR NETWORK SLICES OF A NETWORK

RELATED APPLICATION

This application claims priority to Indian Provisional Patent Application No. 202041019279, filed on May 6, 2020, and entitled "QUALITY OF SERVICE MANAGER FOR NETWORK SLICES OF A NETWORK", the content of which is incorporated by reference herein in its entirety.

BACKGROUND

5G/New Radio (5G/NR) is a next generation global wireless standard. 5G/NR provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like.

SUMMARY

According to some implementations, a method may include receiving information identifying a network slice template associated with a network slice of a network, wherein the network slice is instantiated according to the network slice template; determining, from the network slice template, a quality of service (QoS) profile for the network slice, wherein the QoS profile includes a plurality of performance metrics for corresponding QoS parameters associated with providing a service; monitoring performance of the network slice in association with the QoS profile; determining, based on performance information associated with the performance, that a performance indicator for a QoS parameter of the network slice is outside of a threshold range of a performance metric of the plurality of performance metrics; determining, based on the performance information and the QoS profile, a slice modification to the network slice template for the network slice, wherein the slice modification is configured to cause the performance indicator to be within the threshold range of the performance metric; and causing a network slice orchestrator to update an instantiation of the network slice according to the slice modification and the network slice template.

According to some implementations, a device may include one or more memories and one or more processors. In some implementations, the one or more processors are communicatively coupled to the one or more memories. The one or more processors may be configured to: store, in an entry of a data structure, a network slice template associated with a network slice of a network, wherein the network slice is instantiated according to the network slice template; store, in the entry, a quality of service (QoS) profile for the network slice, wherein the QoS profile includes a plurality of performance metrics for corresponding QoS parameters associated with providing a service; monitor, based on the QoS profile, a performance indicator of an instantiation of the network slice, wherein the performance indicator is associated with a QoS parameter of the QoS profile; determine that the performance indicator is outside of a threshold range of a performance metric of the QoS parameter; determine, based on determining that the performance indicator is outside of the threshold range, a slice modification to the network slice template; and provide the slice modification to a network slice orchestrator to cause the network slice orchestrator to configure a resource, of the network, according to the slice modification and the network slice template.

According to some implementations, a non-transitory computer-readable medium may store one or more instructions. The one or more instructions, when executed by one or more processors of a device, may cause the one or more processors to: store a network slice template associated with a network slice of a network, wherein the network slice is instantiated according to the network slice template; monitor a resource allocation of an instantiation of the network slice in association with the network slice providing a service; determine, based on the network slice template and the network resource allocation, a performance indicator for a quality of service (QoS) parameter of the network slice; determine, based on the performance indicator being outside of a threshold range of a performance metric, a slice modification to the instantiation, wherein the performance metric is associated with the QoS parameter; and cause a network slice orchestrator to configure a resource of the instantiation according to the slice modification.

DETAILED DESCRIPTION

Figure 1A:
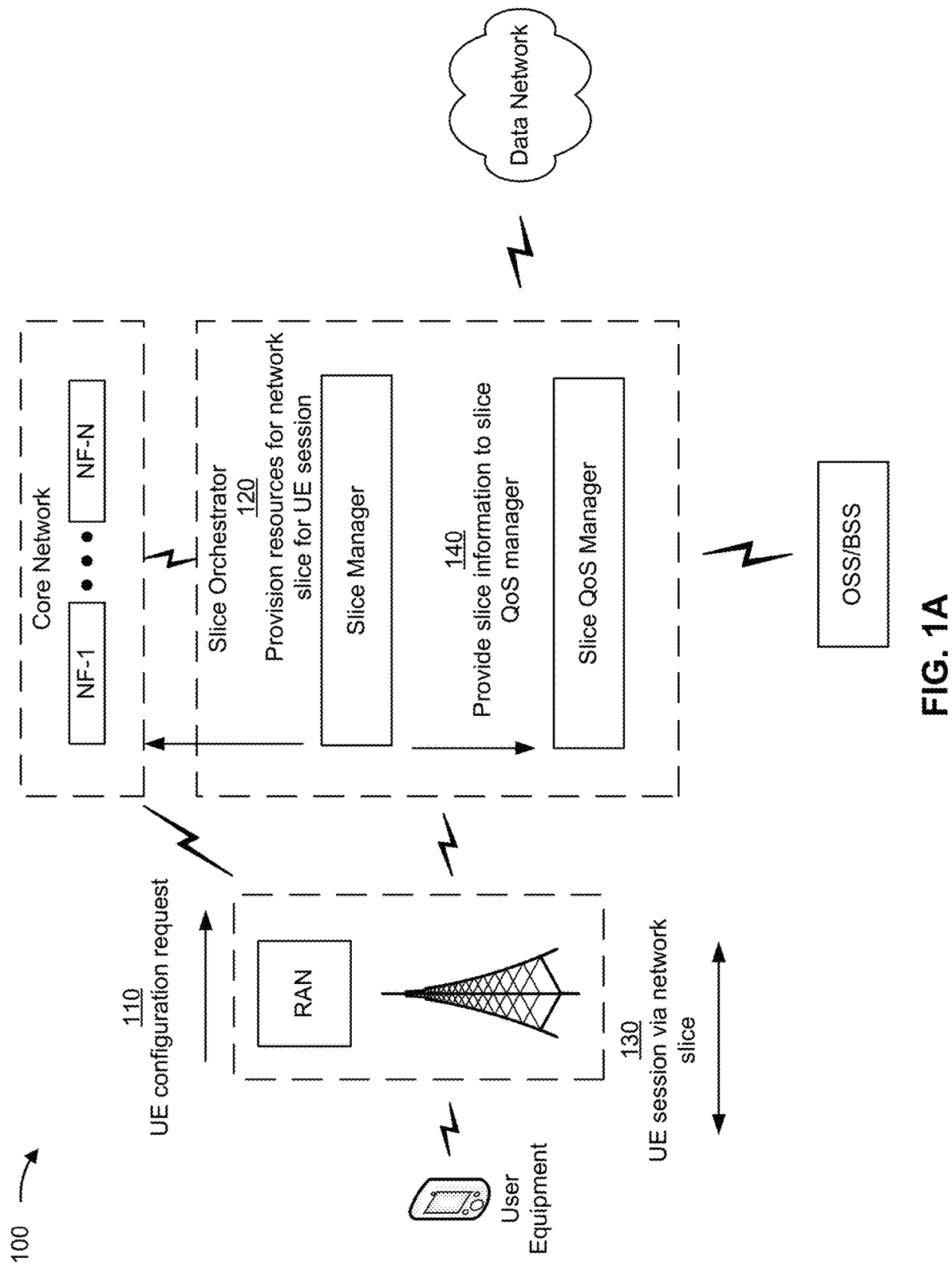
FIGS. 1A-1C are diagrams of an example implementation described herein.

The following detailed description of example implementations refers to the accompanying drawings. The same reference numbers in different drawings may identify the same or similar elements.

In a wireless telecommunications system that includes a 5G wireless network, network slicing may be utilized. Network slicing allows for multiple virtual networks to run on a single physical network to support multiple services, applications, and/or entities (e.g., end users, customers, such as organizations that provide a service to end users of the wireless telecommunications systems, and/or the like). This allows the wireless telecommunications system to serve different industries and/or domains that have distinct service needs, which may be reflected by different quality of service (QoS) requirements for different aspects of service performance and/or quality represented by correspondingly different QoS parameters.

Network slicing is complex and dynamic in nature and typically involves constant changes in network topology that occur at a fast pace. This creates challenges for network components such as an operations support system/business support system (OSS/BSS), for telecommunications operators, and/or the like to monitor network performance. In addition, the complex and dynamic nature of network slicing makes it difficult to make timely adjustments to address issues with network availability, coverage area, bandwidth, latency, packet loss, and/or the like. As a result, critical aspects of the wireless telecommunications system may be unavailable to users, network performance may be degraded, calls may be dropped, and/or the like. Thus, current wireless communication systems that utilize network slicing may waste networking resources, communication resources, computing resources (e.g., processing resources, memory resources, and/or the like), and/or the like associated with failing to address such issues quickly and efficiently. Furthermore, user experience may be negatively impacted (e.g., due to poor network performance, dropped calls, and/or the like).

Some implementations described herein provide a QoS manager that monitors QoS performance of a network slice based on an original configuration of the network slice to determine whether performance metrics are met. The performance metrics may be associated with QoS parameters for a network slice template associated with the network slice. If the performance metrics are not met, the QoS manager causes adjustments to be made (e.g., to network resources, to the network slice, to a network slice template associated with the network slice, to an instantiation of the network slice, and/or the like) in order to improve the QoS performance (e.g., to ensure that QoS parameters are met). For example, the QoS manager may receive information identifying a network slice template associated with a network slice, of a network, that is instantiated according to the network slice template. The QoS manager may determine from the network slice template a QoS profile, for the network slice, that includes a plurality of performance metrics for corresponding QoS parameters associated with providing a service. The QoS manager may monitor performance of the network slice in association with the QoS profile, and may determine, based on performance information associated with the performance, that a performance indicator for a QoS parameter of the network slice is outside of a threshold range of a performance metric of the plurality of performance metrics. The QoS manager may determine, based on the performance information and the QoS profile, a slice modification to the network slice template for the network slice. The slice modification may be configured to cause the performance indicator to be within the threshold range of the performance metric. The QoS manager may cause a network slice orchestrator to update an instantiation of the network slice according to the slice modification and the network slice template.

In this way, the QoS manager monitors QoS performance of a network slice based on the original configuration of the network slice and, if performance metrics associated with QoS parameters for a network slice template associated with the network slice are not met, causes adjustments to be made to improve the QoS performance. As a result, the QoS manager enables critical aspects of the wireless telecommunications system to remain available to users, prevents or minimizes degradation of network performance, prevents or reduces a number of dropped calls, and/or the like. Thus, the QoS manager enables wireless communication systems that utilize network slicing to conserve networking resources, computing resources, and/or the like by addressing such issues quickly and efficiently.

Figure 1B:
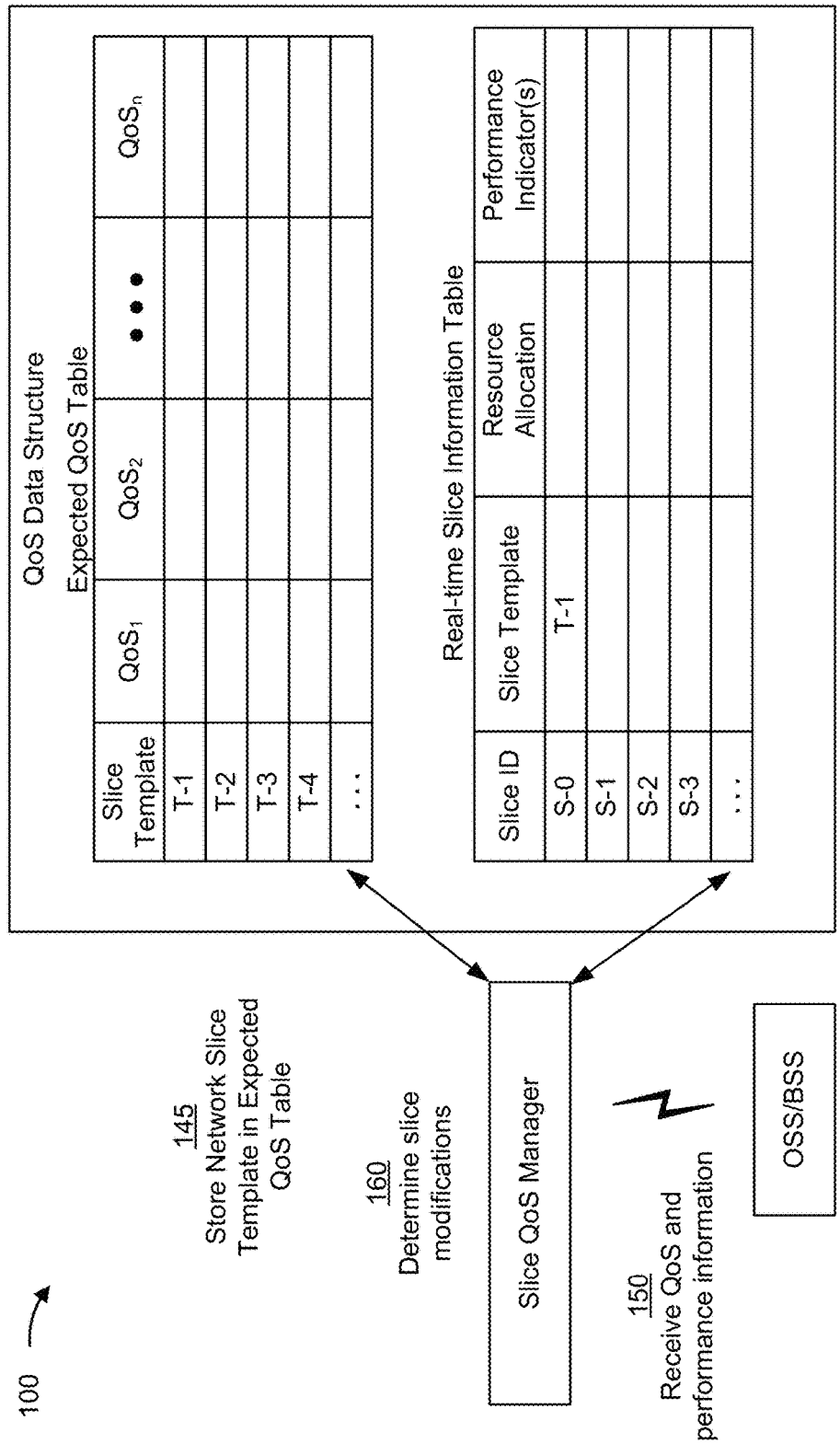
Figure 1C:
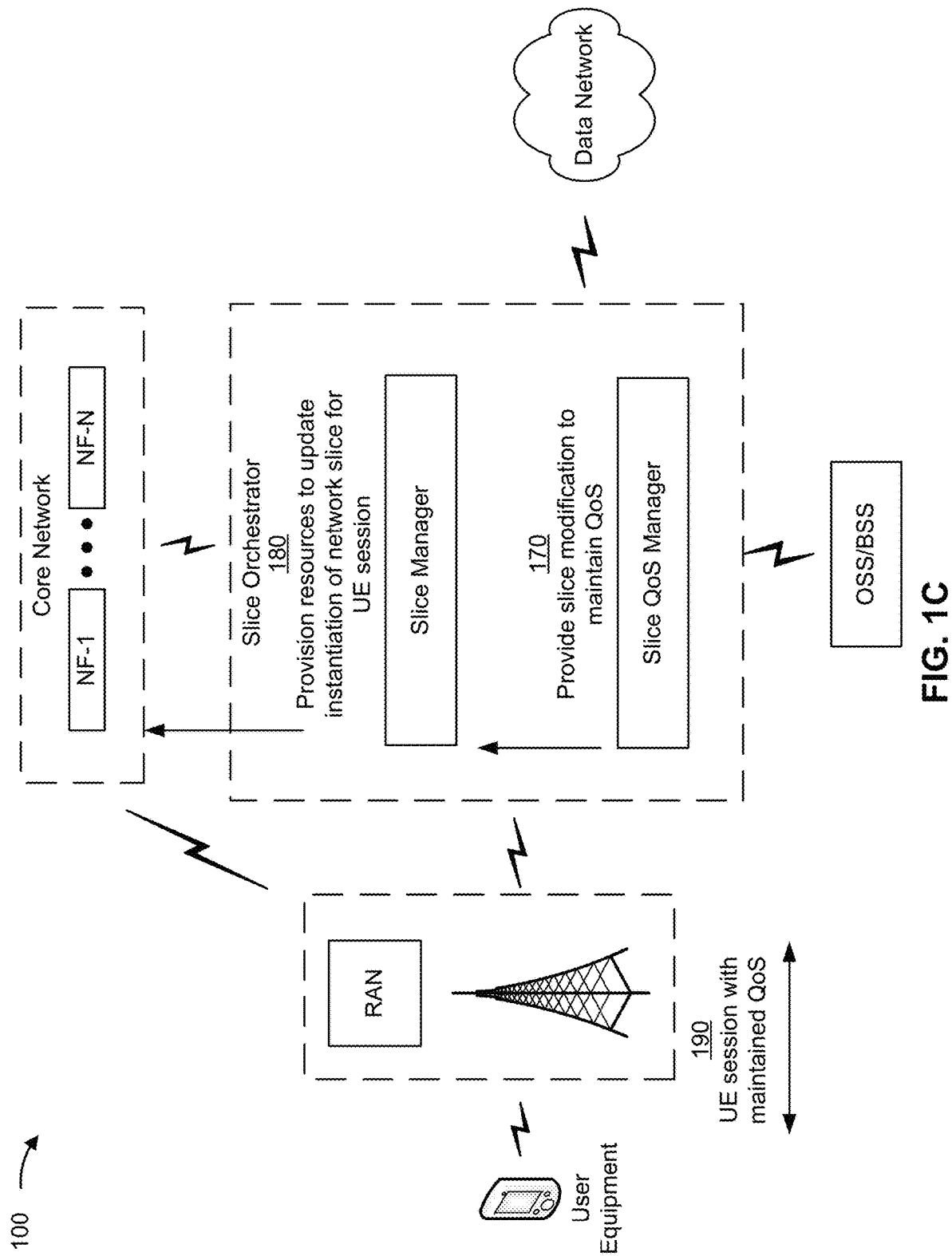

FIGS. 1A-1C are diagrams of an example implementation 100 described herein. Example implementation 100 illustrates various portions of a wireless telecommunications system that includes a 5G wireless network or portions of a 5G wireless network. Additionally, example implementation 100 may include other networks or portions of other networks, such as a 4G wireless network, a long-term evolution (LTE) wireless network, an LTE-Advanced (LTE-A) wireless network, and/or the like.

As shown in FIGS. 1A-1C, example implementation 100 includes a user equipment (UE), a radio access network (RAN), a core network, a slice orchestrator (including a slice manager and a slice QoS manager), an operations support system/business support system (OSS/BSS), and a data network. The UE of example implementation 100 may be a communication device, such as a mobile phone, a smartphone, a laptop computer, a tablet computer, an Internet of Things device, and/or the like. The base station of example implementation 100 may include an access point of the RAN, such as a 5G next generation NodeB (gNodeB or gNB), an LTE evolved NodeB (eNodeB or eNB), and/or the like. In some implementations, the base station may facilitate a communication session by communicating application-specific data between the UE and the core network.

The core network of example implementation 100 may include various types of telecommunications core networks, such as a 5G next generation core network (NG Core), an LTE evolved packet core (EPC), and/or the like. The core network may include, among other components and/or functions, 5G core network functions (NF-1 to NF-N), which may include some or all of the core network functions described below with respect to FIG. 4. The data network of example implementation 100 may include various types of data networks, such as the Internet, a third-party services network, an operator services network, a private network, a wide area network, and/or the like.

The slice orchestrator of example implementation 100 may coordinate operation of network components associated with a network slice. The slice manager of example implementation 100 may manage network slice lifecycles (e.g., creations, modifications, and deletions of network slices), may generate network slice instances (i.e., instantiations of network slices), may manage network slice templates (e.g., customization of network slice templates, utilization of network slide templates to create instantiations of network slices, and/or the like). Additionally, the slice manager may provide an interface between the slice orchestrator and the core network, may manage the association of resources (e.g., core network functions) with network slices, may provision resources for network slices, and/or the like. The slice QoS manager of example implementation 100 may monitor QoS performance of network slices and may cause resources to be adjusted based on performance metrics associated with QoS parameters to improve the QoS performance, as described in greater detail herein.

The OSS/BSS of example implementation 100 may provide support functions for managing and maintaining operation of the wireless telecommunications system. The OSS/BSS may include an operations support system (OSS) for providing functions such as network configuration, service provisioning, fault management (e.g., including detecting and managing network faults associated with network slices), and/or the like. The OSS/BSS may include a business support system (BSS) for providing functions such as product management, order management, revenue management and customer management.

As shown in FIG. 1A, and by reference number 110, the UE may send a UE configuration request (e.g., a UE configuration message) to the base station of the RAN to register the UE and/or initiate a communication session between the UE and the data network. The UE configuration request may include network slice information that identifies a network slice to which the UE is requesting to be connected. The UE configuration request may also include network slice selection assistance information (NSSAI), single-network slice selection assistance information (S-NSSAI), and/or the like.

As further shown in FIG. 1A, and as shown by reference number 120, the slice manager may provision resources for a network slice for a UE session. For example, the slice manager may provision resources (e.g., resources of the core network) associated with an instantiation of the network slice (e.g., a network slice instance) that was identified by the UE in the UE configuration request. The resources may include virtual resources (e.g., virtual machines) and/or physical hardware components. For example, the resources may include particular 5G core network functions (NF-1 to NF-N) such as may be included in FIG. 4, data radio bearers, and/or the like. As shown by reference number 130, the wireless telecommunications system of example implementation 100 may establish a UE session for the UE via a network slice (e.g., the network slice identified by the UE in the UE configuration request). For example, the UE may engage in the UE session using the instantiation of the network slice.

As further shown in FIG. 1A, and as shown by reference number 140, the slice manager may provide network slice information to the slice QoS manager. For example, when a network slice associated with the UE session is instantiated, the slice manager may provide, to the slice QoS manager, information that identifies a network slice template associated with the network slice. The information that identifies the network slice template may include a template identifier of the network slice template, a copy of the network slice template, contents of the network slice template, an address of a location in which the contents of the network slice template are stored, and/or the like.

The network slice template may include information associated with how to instantiate the network slice and how to control the instantiation of the network slice during a life cycle of the instantiation of the network slice. The network slice template may further include information associated with services that can be supported by an instantiation of a network slice, resources that may be utilized by the instantiation, performance requirements or objectives of the instantiation, and/or the like. In some implementations, the slice orchestrator may preconfigure the network slice template (e.g., prior to the slice QoS manager receiving the network slice template) to permit the network slice to provide a service via a particular configuration of resources of the network. For example, the slice orchestrator may preconfigure the network slice template to permit the network slice to provide a particular type of service, such as an ultra-reliable, low-latency communication (URLLC) service, an enhanced-mobile broadband communication (eMBB) service, a massive machine type communication (mMTC) service, a fixed wireless access (FWA) service, and/or the like.

As shown in FIG. 1B, and by reference number 145, the slice QoS manager may store a network slice template in an entry in an expected QoS table of a QoS data structure. For example, the slice QoS manager may receive the information from the slice manager that identifies a network slice template upon instantiation of a corresponding network slice (e.g., the network slice utilized by the UE), modification of the corresponding network slice, and/or the like, and may store the identified network slice template in the expected QoS table based on receiving the information from the slice manager. In some implementations, such as in a case where the information received from the slice manager includes a copy of the slice template, the slice QoS manager may store a copy of the slice template in the expected QoS table. In some implementations, such as in a case where the information from the slice manager includes a template identifier or address of the slice template stored in another location, the slice QoS manager may use the template identifier or address to access the network slice template from another location, and may store a copy or portion of the network slice template in the expected QoS table. Alternatively, the slice QoS manager may store the template identifier or address in the expected QoS table, and may use the template identifier or address to access the network slice template in the future as needed.

The expected QoS table may include information that identifies an expected QoS for each network slice template that may be associated with a network slice. For example, the expected QoS table may include entries for each of multiple network slice templates (T-1, T-2, T-3, T-4, and/or the like). Each network slice template may be associated with a set of QoS parameters ($QoS_1, QoS_2, \ldots, QoS_n$). The QoS parameters may include a bandwidth for providing a service, an end-to-end latency for providing the service, a packet-loss rate associated with providing the service, an availability to provide the service, a minimum throughput for providing the service, a maximum throughput for providing the service, a coverage area in which the service is to be provided, and/or the like.

For each QoS parameter associated with a network slice template, the expected QoS table may include a performance metric. The performance metric may be a designated value or range that must be met in order to provide a QoS associated with the corresponding network slice template. In some implementations, for example, a performance metric may correspond to a minimum value that a QoS parameter should meet in order to provide an expected QoS. Additionally, or alternatively, a performance metric may correspond to a maximum value that a QoS parameter should not exceed in order to provide an expected QoS. As another example, a performance metric may correspond to a value range having a minimum value that a QoS parameter should meet in order to provide an expected QoS and a maximum value that a QoS parameter should not exceed in order to provide an expected QoS. In some implementations, one or more of the performance metrics may be included in an original configuration of the network slice template (e.g., upon instantiation of a corresponding network slice). Additionally, or alternatively, the slice QoS manager may determine one or more of the performance metrics based on other information that is included in the slice template or indicated by the slice template.

For a particular network slice, the slice QoS manager may determine, from a corresponding network slice template, a QoS profile for the network slice. The QoS profile may include a plurality of performance metrics for corresponding QoS parameters associated with providing a service. The service may be customized to specific requirements and/or needs of a user of the UE. For example, the QoS profile may be associated with a URLLC service, an eMBB service, an mMTC service, an FWA service, and/or another service or combination of services that is specifically defined for a particular user or network operator, a particular type of user or network operator, a particular network configuration or environment, and/or the like. The QoS parameters included for the particular network slice, and the performance metrics assigned to each of those QoS parameters, may be specific to the type of service provided.

As shown by reference number 150, the slice QoS manager may receive real-time QoS and performance information. The real-time QoS and performance information may include information, obtained and/or measured in real-time, that is associated with network performance of a network slice. For example, the real-time QoS and performance information may include key performance indicators (e.g., latency, jitter, and/or the like), key quality indicators (e.g., session drops, packet losses, and/or the like), and/or the like.

Based on the real-time QoS and performance information, the slice QoS manager may monitor, in real-time, performance of the network slice, and may store, in real-time, information associated with the real-time QoS and performance information in a real-time slice information table. The real-time slice information table may include entries for each of multiple network slices, each entry having a slice identifier (slice ID) for each network slice (S-0, S-1, S-2, S-3, and/or the like). Each network slice may be associated with a network slice template, a resource allocation, and a set of one or more performance indicators, as described below.

The resource allocation may identify one or more resources (e.g., data radio bearers, particular network functions (such as may be included in FIG. 4), and/or the like) that are currently allocated to the network slice. The performance indicator(s) may include real-time measurements of QoS parameters (e.g., bandwidth, end-to-end latency, packet-loss rate, availability, minimum throughput, maximum throughput, coverage area, and/or the like) relevant to the network slice. Performance indicators may be based on performance information that includes key performance indicators, key quality indicators, and/or the like, as described above. In some implementations, in addition to and/or instead of measurements of QoS parameters, the performance indicators may include an indication of whether performance metrics are met for the QoS parameters, an indication of an amount of change required to satisfy the performance metrics, and/or the like.

The slice QoS manager may store and continually update the resource allocation based on resources currently allocated (e.g., based on information received from the slice manager, the OSS/BSS, and/or the like) for the network slice or an instantiation of the network slice, and may store and continually update the network performance indicators based on currently measured network performance, when receiving the QoS and performance information and monitoring performance of the network slice or an instantiation of the network slice.

As further shown in FIG. 1B, and as shown by reference number 160, the QoS manager may determine slice modifications. For example, the QoS manager may determine a slice modification to a network slice associated with a UE session based on the real-time QoS and performance information. In some implementations, the slice QoS manager may determine the slice modification based on the QoS parameters. As an example, if the UE is utilizing a network slice identified by slice ID S-0, the slice QoS manager may identify slice template T-1 from the real-time slice information table, and may refer to the expected QoS table to determine the performance metrics for each QoS for slice template T-1 to determine the expected QoS for slice template T-1. The slice QoS manager may refer to the performance indicators for network slice S-0 in the real-time slice information table and compare the performance indicators to the performance metrics to determine whether the performance metrics are met (e.g., not outside a designated threshold range). In this way, the QoS manager may monitor QoS performance of a network slice based on the original configuration of the network slice to determine whether performance metrics, associated with QoS parameters for a network slice template associated with the network slice, are met.

As a specific example, if a QoS parameter is end-to-end latency, the performance metric for a particular network slice template may require a latency of 5 ms or less. In this case, if a corresponding performance indicator for a network slice associated with the particular network slice template indicates an end-to-end latency of 12 ms, then the slice QoS manager may determine that the performance indicator is outside of the threshold range of the performance metric, and may therefore determine that a slice modification is indicated for the network slice.

A slice modification, as described above, may be applied to a network slice, a network slice template, an instantiation of a network slice, and/or the like to cause the allocation of additional resources sufficient to improve QoS, bring performance indicators into conformity with performance metrics, and/or the like. The slice modification may be determined based on comparing a performance indicator to a performance metric for a single QoS parameter, comparing performance indicators to performance metrics for multiple QoS parameters, and/or the like. A QoS parameter may independently be a basis for determining that a slice modification is indicated, may be a basis for determining that a slice modification is indicated in combination with other QoS parameters, and/or the like. In some implementations, a slice modification may be determined based on performance indicator measurement(s) taken at a single point in time, based on an average of performance indicator measurement(s) taken over multiple points in time (e.g., consecutive points in time, periodic points in time, and/or the like), and/or the like.

In some implementations, the slice QoS manager may determine a slice modification based on the quantity of network resources that is currently allocated to the network slice. For example, the slice QoS manager may receive (e.g., from the OSS/BSS) information indicating the current allocation of network resources to the network slice. The slice QoS manager may identify, using the real-time slice information table, the slice template associated with the network slice. The slice QoS manager may determine, using the expected QoS table, the quantity of resources that are expected to be associated with the network slice. In the event that the current quantity of resources exceeds the expected quantity of resources, the slice QoS manager may remove resources currently associated with the network slice. To remove resources currently associated with the network slice, the slice QoS manager may return those resources to an available network resource inventory. In the event the current quantity of resources is below the expected quantity of resources, the slice QoS manager may associate additional resources with the network slice. To associate additional resources with the network slice, the slice QoS manager may identify the resources in an available network resource inventory and may select the resource to be included in an instantiation of the network slice.

In some implementations, in addition to determining slice modifications based on QoS issues and/or resource issues identified using the QoS data structure, the slice QoS manager may determine slice modifications based on other information. For example, the slice QoS manager may determine slice modifications based on information (e.g., alerts) received from the OSS/BSS. The OSS/BSS may provide fault management functions that detect network faults, and when a network fault occurs for a network slice, the OSS/BSS may provide a notification of the detected network faults to the slice QoS manager. As another example, the slice QoS manager may determine slice modifications based on information provided by the UE. In this case, the UE may measure network characteristics (e.g., signal strength), and may send a measurement report to the base station that triggers a notification to the slice QoS manager, which may prompt the slice QoS manager to determine a slice modification. In some implementations, the slice QoS manager may determine the slice modification based on the notification in combination with other factors, such as QoS issues or resource issues, as described above.

As shown in FIG. 1C, and by reference number 170, the slice QoS manager may provide a slice modification to the slice manager in order to maintain QoS. In some implementations, the slice QoS manager may provide information to the slice manager identifying the slice template and changes to be made to accomplish the slice modification (e.g., changes to resources associated with the network slice). In some implementations, such as in a case where the slice QoS manager stores (e.g., maintains a copy of) the network slice template in the expected QoS table, the slice QoS manager may modify the copy of the network slice template in the expected QoS table to incorporate the changes, and provide the copy of the network slice template to the slice manager. Additionally, or alternatively, such as in a case where the slice QoS manager stores an identifier or address of the slice template that is accessible to (e.g., maintained and managed by) the network slice manager, the slice QoS manager may use the identifier or address to access and make changes to the network slice template that the slice manager will access thereafter.

As further shown in FIG. 1C, and as shown by reference number 180, the slice manager may provision resources to update an instantiation of the network slice for a UE session (e.g., based on the slice modification provided by the slice QoS manager). As described above, the resources may include virtual resources (e.g., virtual machines) and/or physical hardware components. For example, the resources may include particular 5G core network functions (NF-1 to NF-N) such as may be included in FIG. 4, data radio bearers, and/or the like. As further shown in FIG. 1C, and as shown by reference number 190, the wireless telecommunications system of example implementation 100 may continue the UE session established as described above with respect to FIG. 1A, or may establish a new UE session for the UE, that maintains the QoS based on the slice modification.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2A:
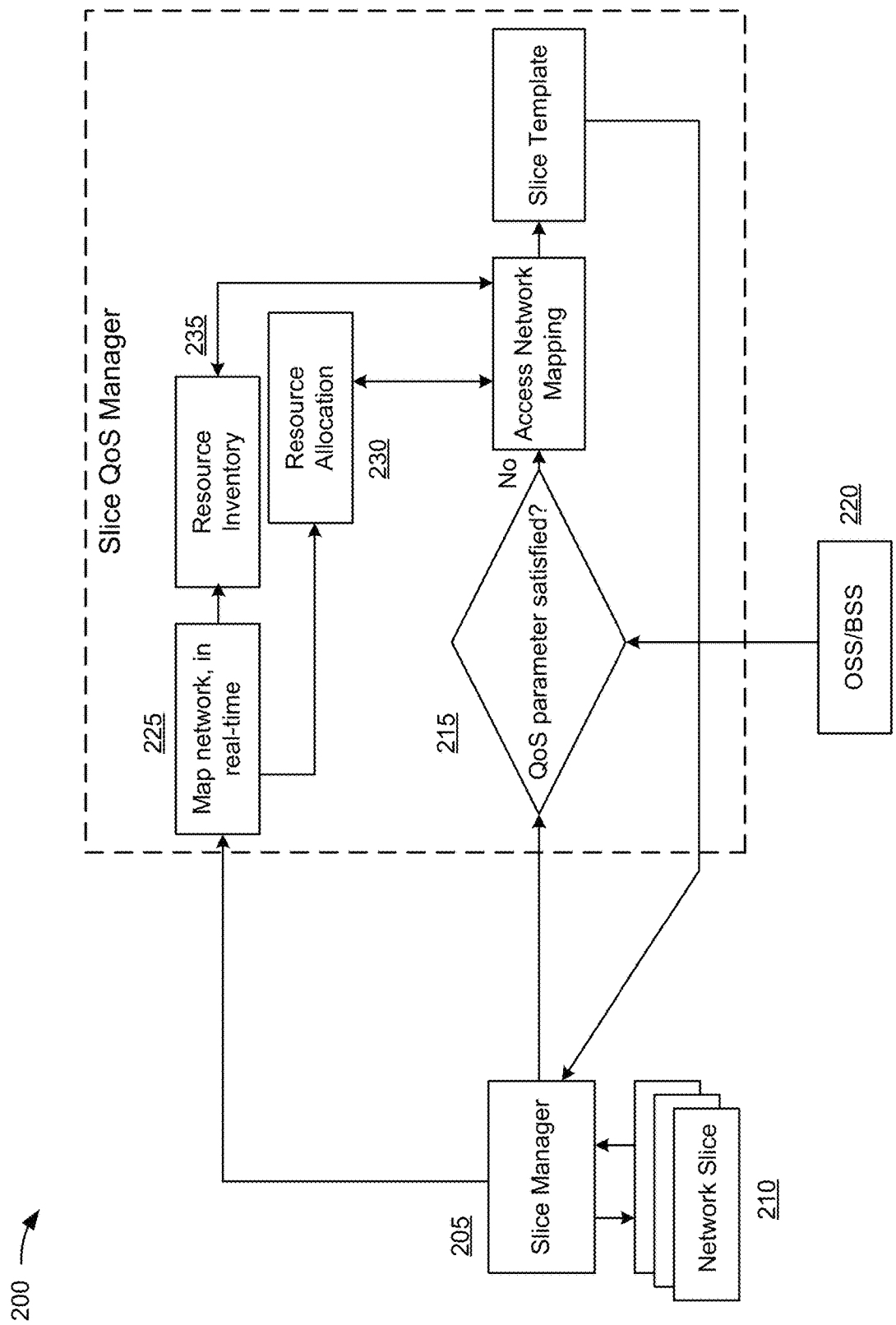
FIGS. 2A-2B are diagrams of an example structure and flow in example implementations.

FIG. 2A is a diagram of an example structure and flow in an example implementation 200. FIG. 2A shows a structure and flow associated with the slice QoS manager. As shown in FIG. 2A, slice manager 205 may manage deployed network slices 210, and may provide QoS and performance information to a QoS parameter determination function 215 within the slice QoS manager. Additionally, or alternatively, OSS/BSS 220 may provide QoS and performance information to the QoS parameter determination function 215. QoS parameter determination function 215 may receive the QoS and performance information (e.g., as described above in connection with reference number 150 of FIG. 1B), and may determine whether the QoS and performance information (e.g., performance indicators for a network slice template associated with a network slice of network slices 210) satisfy QoS parameters (e.g., performance metrics associated with the QoS parameters), as described in connection with reference number 160 of FIG. 1B above. Monitoring of the QoS and performance information and performing of QoS parameter determination function 215 may continue with respect to thousands, millions, and/or the like of QoS parameters, network slices, instantiations of network slices, network slice templates, and/or the like.

If QoS parameter determination function 215 determines that a QoS parameter is not satisfied for a network slice, the slice QoS manager may access network mapping functions. The network mapping functions may include a real-time mapping function 225, which may perform resource allocation function 230 for the network slice (e.g., by accessing the resource allocation entry of the real-time slice information table for the network slice, as described above in connection with reference number 160 of FIG. 1B) to determine whether the real-time resource allocation for the network slice matches a resource configuration (e.g., in the network slice template associated with the network slice, such as may be stored in the expected QoS table). If the real-time resource allocation for the network slice does not match the resource configuration, the real-time mapping function 225 may access network resource inventory 235 to determine the availability of resources that may be allocated to an instantiation of the network slice. If the required resources are available, the slice QoS manager may cause an allocation of resources based on the slice template associated with the network slice by indicating to slice manager 205 that slice manager 205 should deploy the additional slice resources (e.g., as described above in connection with reference number 170 of FIG. 1C), and slice manager 205 may deploy the additional slice resources and update the real-time inventory status.

In some implementations, rather than performing QoS parameter determination function 215 and only accessing the network mapping functions if a QoS parameter is not satisfied, the slice QoS manager may access the network mapping functions without performing QoS parameter determination function 215, without determining that a QoS parameter is not satisfied, and/or the like (e.g., for all network slices, instantiations of network slices, slice templates, and/or the like). In this case, in addition to deploying additional resources when more resources are needed or otherwise as indicated as described above, the slice QoS manager may cause the slice manager to remove resources if the resource allocation substantially exceeds (e.g., exceed by a predetermined amount) the resource configuration.

As indicated above, FIG. 2A is provided as an example. Other examples may differ from what is described with regard to FIG. 2A. The number and arrangement of functional blocks shown in FIG. 2A are provided as an example. In practice, there may be additional functional blocks, fewer functional blocks, different functional blocks, or differently arranged than those shown in FIG. 2A. Furthermore, two or more functional blocks shown in FIG. 2A may be implemented within a single device, or a single functional block shown in FIG. 2A may be implemented as multiple, distributed devices. Additionally, or alternatively, a set of devices (e.g., one or more devices) shown in FIG. 2A may perform one or more functions described as being performed by another set of devices shown in FIG. 2A.

Figure 2B:
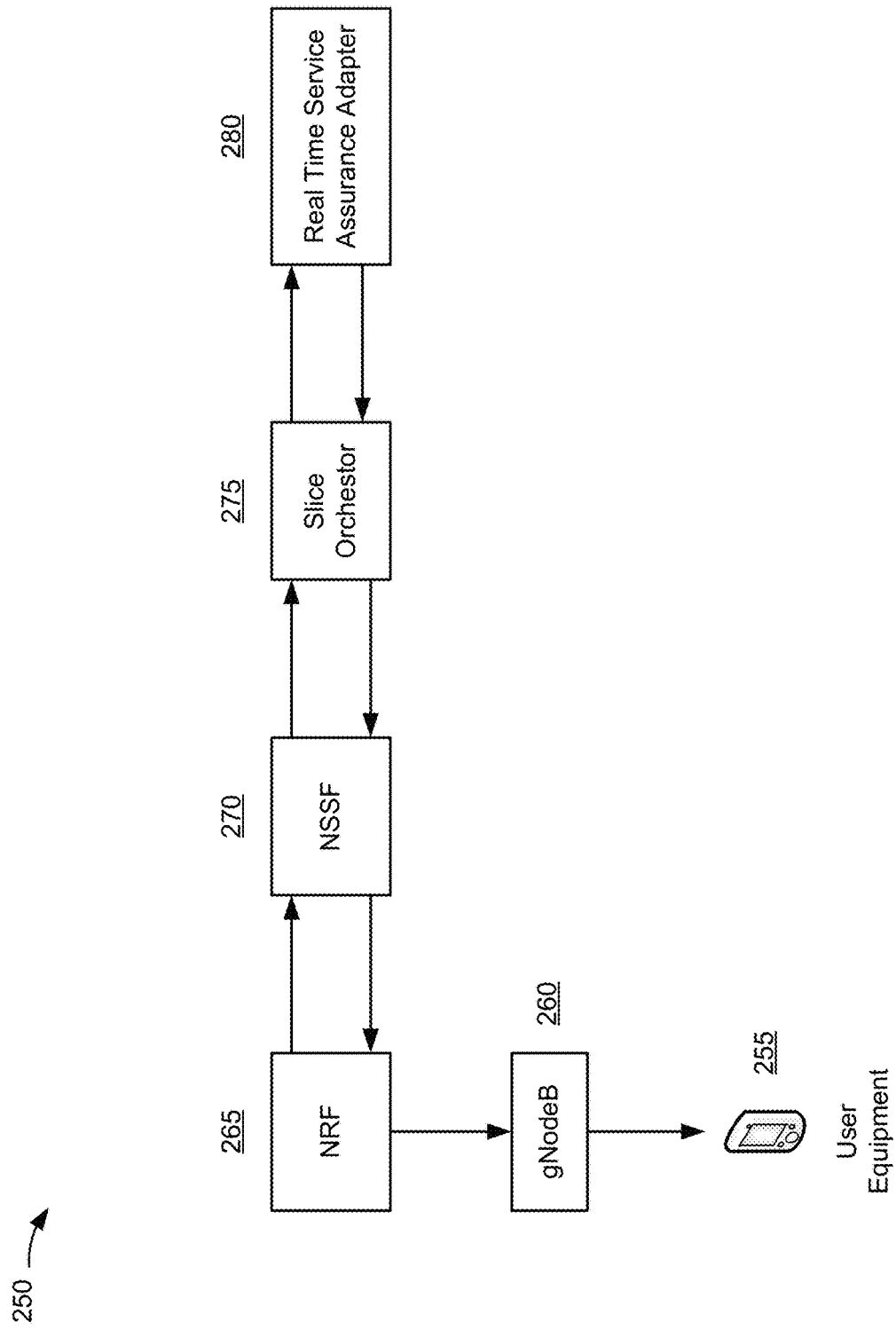

FIG. 2B is a diagram of an example structure and flow in an example implementation 250. FIG. 2B shows the integration of a slice QoS manager (e.g., a real-time service assurance adapter) with network functions to fetch data required for decision making functions associated with utilization of network slices. The slice QoS manager manages QoS information, associated with a network slice and captured via the network functions, and performs real-time decisions about slice modifications based on the QoS information. The real-time decisions are based on comparing expected information (e.g., expected QoS information and/or resources associated with a network slice template for the network slice) and real-time information (e.g., real-time QoS information and/or resource allocation for the network slice).

Example implementation 250 may include a UE 255, a gNodeB 260, a network resource function (NRF) 265, a network slice selection function (NSSF) 270, a slice orchestrator 275, and a real-time service assurance adapter 280. UE 255 may be a UE such as described with respect to FIG. 1, and gNodeB 260 may be associated with a base station, a RAN, and/or the like, such as are described with respect to FIG. 1. NRF 265 may be part of a core network such as described with respect to FIG. 1, and may correspond to NRF 410 described with respect to FIG. 4 below. NSSF 270 may also be part of a core network such as described with respect to FIG. 1, and may correspond to NSSF 404 described with respect to FIG. 4 below. Slice orchestrator 275 may correspond to the slice orchestrator described with respect to FIG. 1 (excluding functions performed by the slice QoS manager) and may include, for example, a slice manager as described with respect to FIG. 1. Real-time service assurance adapter 280 may correspond to the slice QoS manager of FIG. 1, and may include a network service orchestrator, an alarm monitoring function, an auto rerouting function, a repository for network slice templates, a real-time network mapping function, a repository for deployed network slices, a QoS management function, a network slice inventory management function, and/or the like.

As shown in FIG. 2B, NRF 265 may receive a UE configuration request from UE 255 via gNodeB 260. The UE configuration request may identify a network slice that the UE is requesting to utilize in a UE session. NRF 265 may receive the UE configuration request and reference a profile of available network functions to access NSSF 270, and may provide an identifier of the network slice to NSSF 270. NSSF 270 may utilize a network slice template to generate an instantiation of the network slice, and may provide the network slice template to slice orchestrator 275. Slice orchestrator 275 may provide the network slice template, a portion of the network slice template, an identifier or address of the network slice template, or the like, to real-time service assurance adapter 280. Real-time service assurance adapter 280 may store the network slice template, portion of the network slice template, or identifier or address of the network slice template in an expected QoS table that includes resource information identifying resources to be associated with the corresponding network slice, and includes a QoS profile associated with the network slice template. The QoS profile may include performance metrics associated with QoS parameters, as described above with respect to FIG. 1.

Real-time service assurance adapter 280 may thereafter receive QoS and performance information in real-time to monitor performance of the network slice. Real-time service assurance adapter 280 may store the QoS and performance information in a real-time slice information table, and may continually update the real-time slice information table upon continually receiving new QoS and performance information. The real-time slice information table may also include a current resource allocation for the network slice. Real-time service assurance adapter 280 may continually compare the QoS and performance information of the network slice to the performance metrics for QoS parameters in the expected QoS table for the network slice template associated with the network slice, and/or may continually compare the current resource allocation in the real-time slice information table to the resource information in the expected QoS table.

If the performance metrics are not satisfied by the performance information, and/or the resource information is not matched by the current resource allocation, then real-time service assurance adapter 280 may determine a slice modification to the network slice. Real-time service assurance adapter 280 may provide information associated with the slice modification to slice orchestrator 275. Slice orchestrator 275 may provide information to NSSF 270 to provision resources based on the slice modification. NSSF 270 may communicate with gNodeB 260 via NRF 265 to allocate the resources to the network slice, and the resources may be used in a UE session of 255. Allocating the resources may cause performance associated with the network slice to satisfy an expected QoS (e.g., may cause performance indicators to satisfy performance metrics, may cause currently allocated resources to match expected resources, and/or the like).

As indicated above, FIG. 2B is provided as an example. Other examples may differ from what is described with regard to FIG. 2B. The number and arrangement of functional blocks shown in FIG. 2B are provided as an example. In practice, there may be additional functional blocks, fewer functional blocks, different functional blocks, or differently arranged than those shown in FIG. 2B. Furthermore, two or more functional blocks shown in FIG. 2B may be implemented within a single device, or a single functional block shown in FIG. 2B may be implemented as multiple, distributed devices. Additionally, or alternatively, a set of devices (e.g., one or more devices) shown in FIG. 2B may perform one or more functions described as being performed by another set of devices shown in FIG. 2B.

Figure 3:
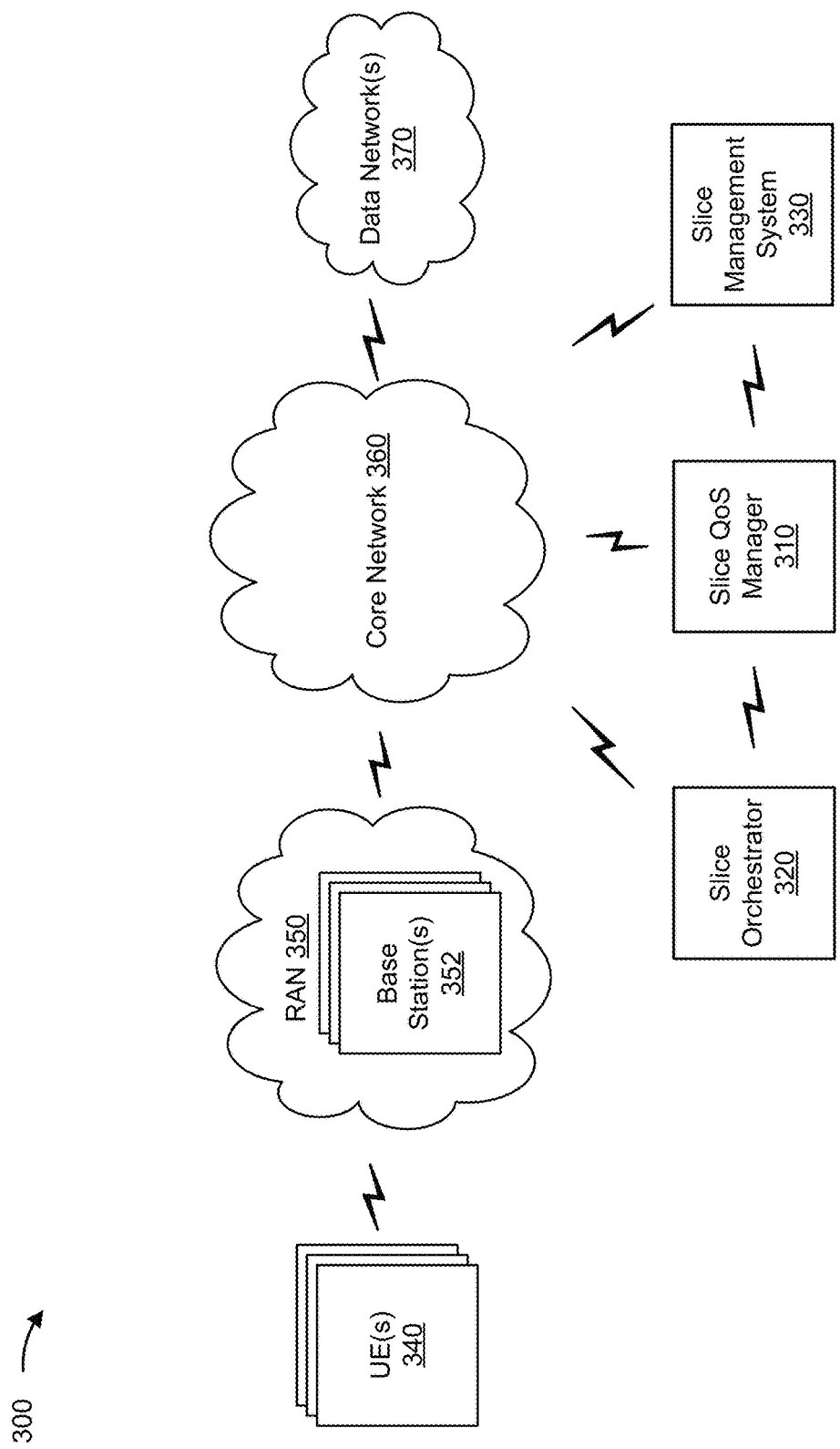
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a slice QoS manager 310, a slice orchestrator 320, a slice management system 330, one or more UE(s) 340, a RAN 350, one or more base station(s) 352, a core network 360, and a data network 370. Devices of environment 300 may interconnect via wired connections, wireless connections, or a combination of wired and wireless connections.

Slice QoS manager 310 may include one or more devices capable of interacting with slice orchestrator 320 (or integrated within slice orchestrator 320), interacting with slice management system 330, interacting with core network 360, and/or the like to monitor QoS performance of a network slice, to determine whether performance metrics associated with QoS parameters are met, to cause adjustments to be made to improve the QoS performance (e.g., to cause the QoS parameters to be met), and/or the like. In some implementations, slice QoS manager 310 may correspond to the slice QoS manager described above with respect to FIGS. 1A-1C and 2.

Slice orchestrator 320 may include one or more devices capable of coordinating network components associated with a network slice. Slice orchestrator 320 may create a mapping of network slices and logical/physical/virtual network functions, may provide optimized allocation of network resources by automatically coordinating network slice lifecycle and network functions to domains, and/or the like. In some implementations, slice QoS manager 310 may correspond to the slice orchestrator described above with respect to FIGS. 1A-1C and 2.

Slice management system 330 may include one or more devices capable of providing an interface between the slice orchestrator and the core network, managing the association of resources (e.g., core network functions) with network slices, and/or the like. Slice management system 330 may provide management functions for a specific network slice, such as access permissions and inter-slice interaction. Slice management system 330 may allow external parties to access the network slice via application programming interfaces (APIs) and may allow dynamic network customization based on operator direction. In some implementations, slice management system 330 may correspond to the slice manager described above with respect to FIGS. 1A-1C and 2.

UE 340 may include one or more devices capable of communicating with base station 352 and/or a network (e.g., data network 370). For example, UE 340 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable device (e.g., smart glasses, a smart watch, smart jewelry, and/or the like), and/or a similar device. UE 340 may be capable of communicating using uplink (e.g., UE to base station) communications, downlink (e.g., base station to UE) communications, and/or sidelink (e.g., UE-to-UE) communications. In some implementations, UE 340 may include a machine-type communication (MTC) UE, such as an evolved or enhanced MTC (eMTC) UE. In some implementations, UE 340 may include an Internet of Things (IoT) UE, such as a narrowband IoT (NB-IoT) UE and/or the like.

RAN 350 may include a base station and be operatively connected, via a wired and/or wireless connection, to the core network 360 through UPF 424. RAN 350 may facilitate communication sessions between UEs and data network 370 by communicating application-specific data between RAN 350 and core network 360. As described below, data network 370 may include various types of data networks, such as the Internet, a third-party services network, an operator services network, a private network, a wide area network, and/or the like.

Base station 352 includes one or more devices capable of communicating with UE 340 using a cellular radio access technology (RAT). For example, base station 352 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 352 may transfer traffic between UE 340 (e.g., using a cellular RAT), other base stations 352 (e.g., using a wireless interface or a backhaul interface, such as a wired backhaul interface), and/or data network 370. Base station 352 may provide one or more cells that cover geographic areas. Some base stations 352 may be mobile base stations. Some base stations 352 may be capable of communicating using multiple RATs.

In some implementations, base station 352 may perform scheduling and/or resource management for UEs 340 covered by base station 352 (e.g., UEs 340 covered by a cell provided by base station 352). In some implementations, base stations 352 may be controlled or coordinated by a network controller, which may perform load balancing, network-level configuration, and/or the like. The network controller may communicate with base stations 352 via a wireless or wireline backhaul. In some implementations, base station 352 may include a network controller, a self-organizing network (SON) module or component, or a similar module or component. In other words, a base station 352 may perform network control, scheduling, and/or network management functions (e.g., for other base stations 352 and/or for uplink, downlink, and/or sidelink communications of UEs 340 covered by the base station 352). In some implementations, base station 352 may include a central unit and multiple distributed units. The central unit may coordinate access control and communication with regard to the multiple distributed units. The multiple distributed units may provide UEs 340 and/or other base stations 352 with access to data network 370.

Core network 360 may include various types of core network architectures, such as a 5G NG Core (e.g., core network 360 of FIG. 3), an LTE EPC, and/or the like. In some implementations, core network 360 may be implemented on physical devices, such as a gateway, a mobility management entity, and/or the like. In some implementations, the hardware and/or software implementing core network 360 may be virtualized (e.g., through the use of network function virtualization and/or software-defined networking), thereby allowing for the use of composable infrastructure when implementing core network 360. In this way, networking, storage, and compute resources may be allocated to implement the functions of core network 360 in a flexible manner as opposed to relying on dedicated hardware and software to implement these functions.

Data network 370 may include one or more wired and/or wireless data networks. For example, data network 370 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
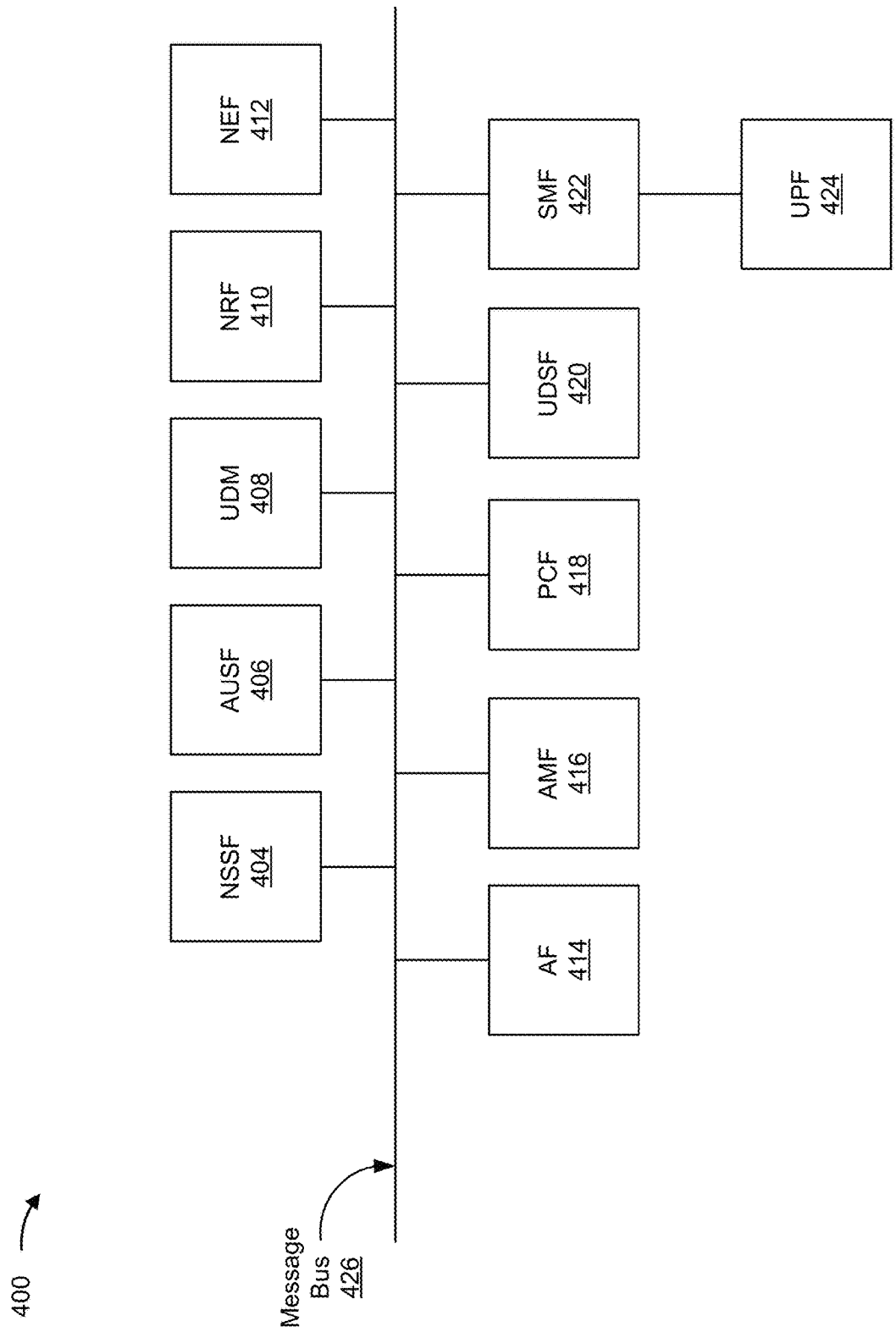
FIG. 4 is a diagram of an example functional architecture of an example core network described herein.

FIG. 4 is a diagram of an example functional architecture of a core network 400 in which systems and/or methods, described herein, may be implemented. For example, FIG. 4 may show an example functional architecture of a 5G NG core network included in a 5G wireless telecommunications system. In some implementations, the example functional architecture may be implemented by a core network (e.g., core network 360 of FIG. 3) and/or one or more devices (e.g., a device described with respect to FIG. 5). While the example functional architecture of core network 400 shown in FIG. 4 may be an example of a service-based architecture, in some implementations, core network 400 may be implemented as a reference-point architecture.

As shown in FIG. 4, core network 400 may include a number of functional elements. The functional elements may include, for example, a network slice selection function (NSSF) 404, an authentication server function (AUSF) 406, a unified data management function (UDM) 408, a network resource function (NRF) 410, a network exposure function (NEF) 412, an application function (AF) 414, an access and mobility management function (AMF) 416, a policy control function (PCF) 418, an unstructured data storage function (UDSF) 420, a session management function (SMF) 422, a user plane function (UPF) 424, and a message bus 426. These functional elements may be communicatively connected via a message bus 426, which may be comprised of one or more physical communication channels and/or one or more virtual communication channels. Each of the functional elements shown in FIG. 4 is implemented on one or more devices associated with a wireless telecommunications system. In some implementations, one or more of the functional elements may be implemented on physical devices, such as an access point, a base station, a gateway, a server, and/or the like. In some implementations, one or more of the functional elements may be implemented on one or more computing devices of a cloud computing environment associated with the wireless telecommunications system. In some implementations, the core network 400 may be operatively connected to a RAN 350, a data network 370, and/or the like, via wired and/or wireless connections with UPF 424.

NSSF 404 may select network slice instances for UEs, where NSSF 404 may determine a set of network slice policies to be applied at the RAN 350. By providing network slicing, NSSF 404 allows an operator to deploy multiple substantially independent end-to-end networks potentially with the same infrastructure. In some implementations, each slice may be customized for different services. NEF 412 may support the exposure of capabilities and/or events in the wireless telecommunications system to help other entities in the wireless telecommunications system discover network services and/or utilize network resources efficiently.

NRF 410 may register network functions and the services provided by the network functions, and may maintain a network function profile of available instances of network functions and a list of available services. AUSF 406 may act as an authentication server and support the process of authenticating UEs in the wireless telecommunications system. UDM 408 may store subscriber data and profiles in the wireless telecommunications system. UDM 408 may be used for fixed access, mobile access, and/or the like, in core network 360. PCF 418 may provide a policy framework that incorporates network slicing, roaming, packet processing, mobility management, and/or the like.

AF 414 may determine whether UEs provide preferences for a set of network slice policies and support application influence on traffic routing, access to NEF 412, policy control, and/or the like. AMF 416 may provide authentication and authorization of UEs and mobility management.

UDSF 420 includes one or more data structures configured to store information, mappings, and/or the like associated with the core network 400.

SMF 422 may support the establishment, modification, and release of communication sessions in the wireless telecommunications system. For example, SMF 422 may configure traffic steering policies at UPF 424, enforce UE IP address allocation and policies, and/or the like. AMF 416 and SMF 422 may act as a termination point for Non-Access Stratum (NAS) signaling, mobility management, and/or the like. SMF 422 may act as a termination point for session management related to NAS. RAN 350 may send information (e.g., the information that identifies the UE) to AMF 416 and/or SMF 422 via PCF 418.

UPF 424 may serve as an anchor point for intra/inter RAT mobility. UPF 424 may apply rules to packets, such as rules pertaining to packet routing, traffic reporting, handling user plane QoS, and/or the like. UPF 424 may determine an attribute of application-specific data that is communicated in a communication session. UPF 424 may receive information (e.g., information that identifies the communications attribute of the application) from RAN 350 via SMF 422 or an API. Message bus 426 represents a communication structure for communication among the functional elements. In other words, message bus 426 may permit communication between two or more functional elements. Message bus 426 may be a message bus, HTTP/2 proxy server, and/or the like.

The number and arrangement of functional elements shown in FIG. 4 are provided as an example. In practice, there may be additional functional elements, fewer functional elements, different functional elements, or differently arranged functional elements than those shown in FIG. 4. Furthermore, two or more functional elements shown in FIG. 4 may be implemented within a single device, or a single functional element shown in FIG. 4 may be implemented as multiple, distributed devices. Additionally, or alternatively, a set of functional elements (e.g., one or more functional elements) of core network 400 may perform one or more functions described as being performed by another set of functional elements of core network 400.

Figure 5:
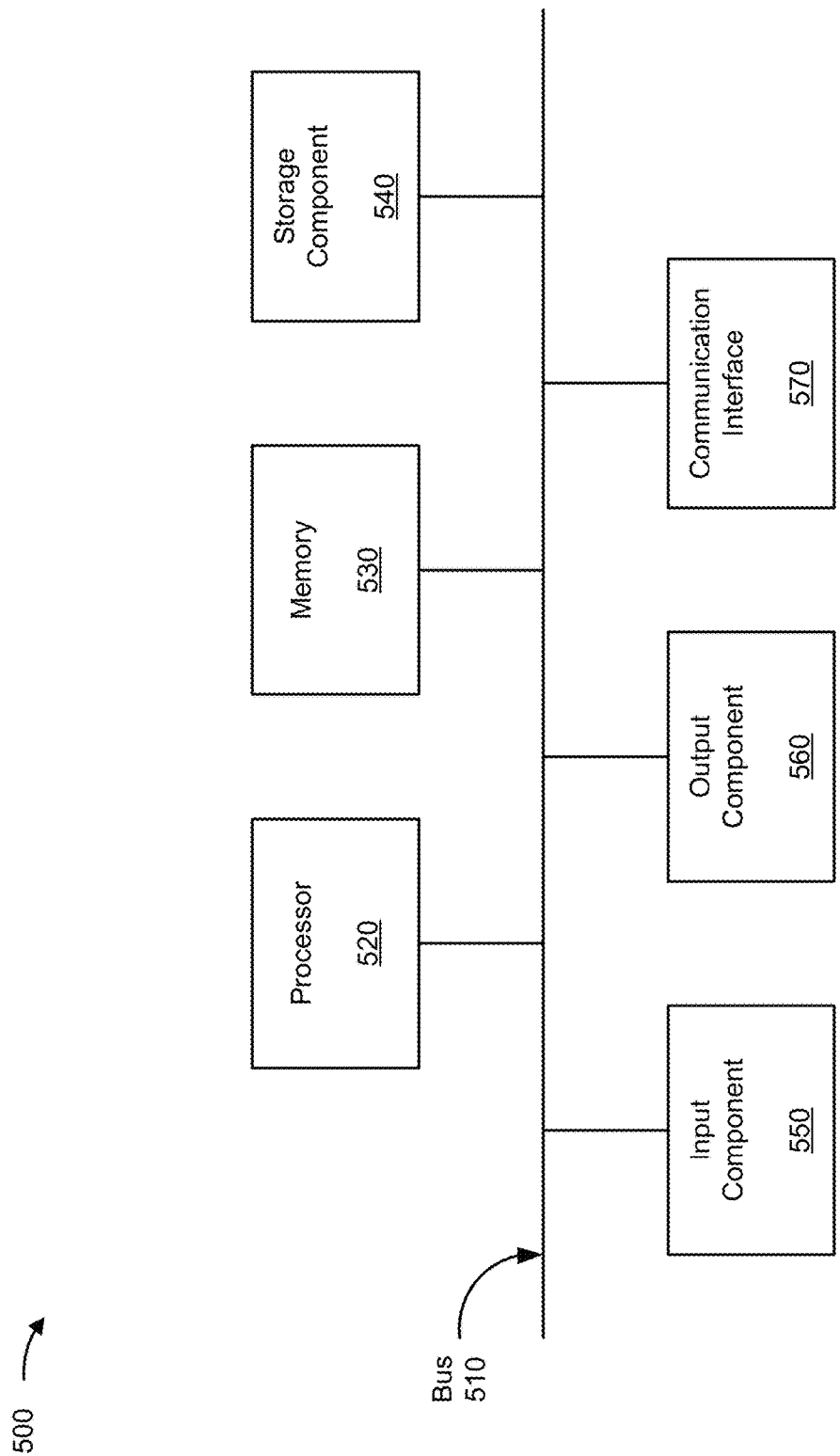
FIG. 5 is a diagram of example components of one or more devices of FIG. 3.

FIG. 5 is a diagram of example components of a device 500. Device 500 may correspond to slice QoS manager 310, slice orchestrator 320, slice management system 330, UE(s) 340, and/or base station(s) 352. In some implementations, slice QoS manager 310, slice orchestrator 320, slice management system 330, UE(s) 340, and/or base station(s) 352 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
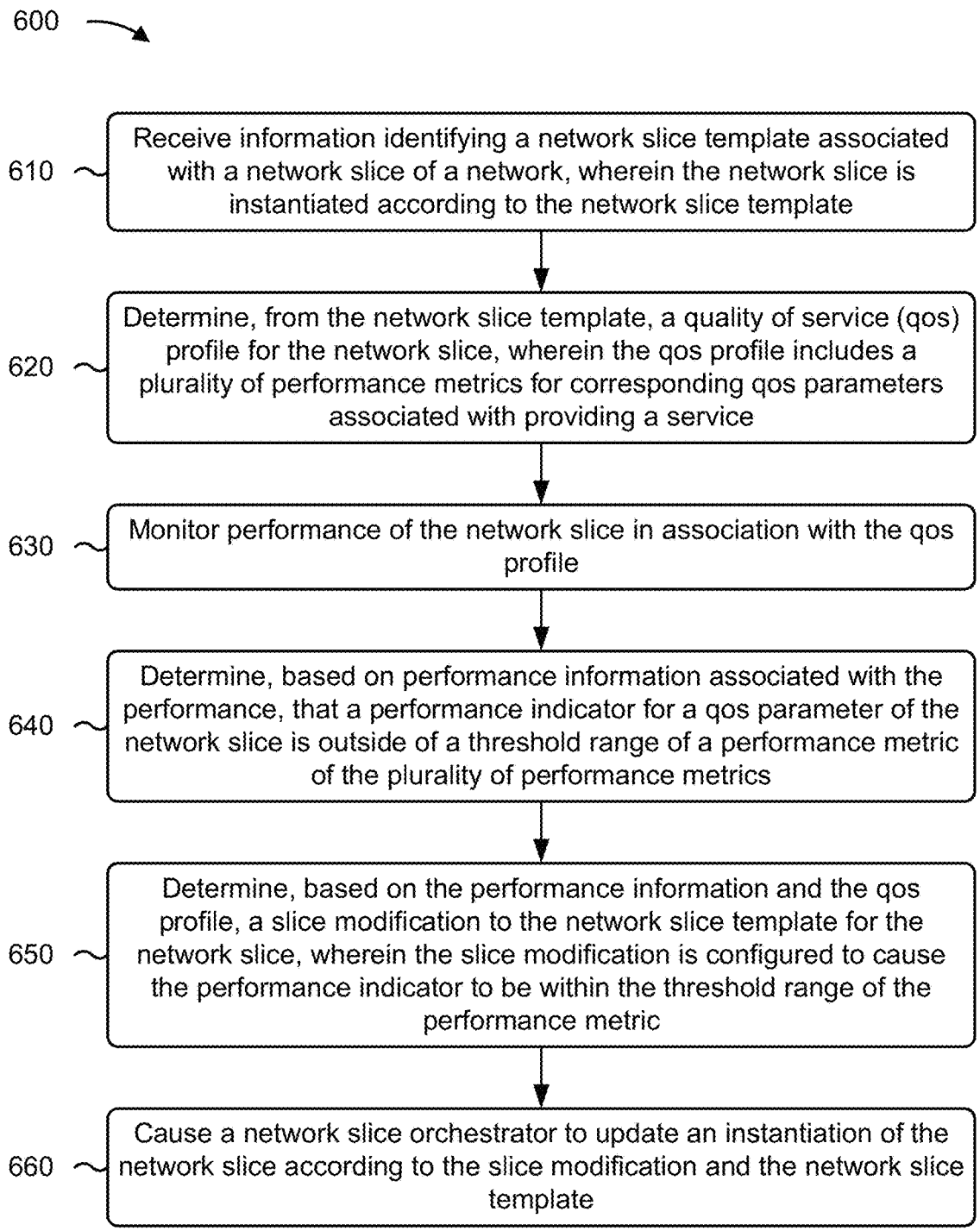
FIGS. 6-8 are flow charts of example processes relating to quality of service management for network slices of a network.

FIG. 6 is a flow chart of an example process 600 associated with quality of service management for network slices of a network. In some implementations, one or more process blocks of FIG. 6 may be performed by a slice QoS manager (e.g., slice QoS manager 310). In some implementations, one or more process blocks of FIG. 6 may be performed by another device or a group of devices separate from or including the slice QoS manager, such as a slice orchestrator (e.g., slice orchestrator 320), a slice management system (e.g., slice management system 330), a UE (e.g., UE 340), a base station (e.g., base station 352), and/or the like.

As shown in FIG. 6, process 600 may include receiving information identifying a network slice template associated with a network slice of a network, wherein the network slice is instantiated according to the network slice template (block 610). For example, the slice QoS manager (e.g., using processor 520, memory 530, storage component 540, input component 550, output component 560, communication interface 570, and/or the like) may receive information identifying a network slice template associated with a network slice of a network, as described above. In some implementations, the network slice is instantiated according to the network slice template.

As further shown in FIG. 6, process 600 may include determining, from the network slice template, a quality of service (QoS) profile for the network slice, wherein the QoS profile includes a plurality of performance metrics for corresponding QoS parameters associated with providing a service (block 620). For example, the slice QoS manager (e.g., using processor 520, memory 530, storage component 540, input component 550, output component 560, communication interface 570, and/or the like) may determine, from the network slice template, a QoS profile for the network slice, as described above. In some implementations, the QoS profile includes a plurality of performance metrics for corresponding QoS parameters associated with providing a service.

As further shown in FIG. 6, process 600 may include monitoring performance of the network slice in association with the QoS profile (block 630). For example, the slice QoS manager (e.g., using processor 520, memory 530, storage component 540, input component 550, output component 560, communication interface 570, and/or the like) may monitor performance of the network slice in association with the QoS profile, as described above.

As further shown in FIG. 6, process 600 may include determining, based on performance information associated with the performance, that a performance indicator for a QoS parameter of the network slice is outside of a threshold range of a performance metric of the plurality of performance metrics (block 640). For example, the slice QoS manager (e.g., using processor 520, memory 530, storage component 540, input component 550, output component 560, communication interface 570, and/or the like) may determine, based on performance information associated with the performance, that a performance indicator for a QoS parameter of the network slice is outside of a threshold range of a performance metric of the plurality of performance metrics, as described above.

As further shown in FIG. 6, process 600 may include determining, based on the performance information and the QoS profile, a slice modification to the network slice template for the network slice, wherein the slice modification is configured to cause the performance indicator to be within the threshold range of the performance metric (block 650). For example, the slice QoS manager (e.g., using processor 520, memory 530, storage component 540, input component 550, output component 560, communication interface 570, and/or the like) may determine, based on the performance information and the QoS profile, a slice modification to the network slice template for the network slice, as described above. In some implementations, the slice modification is configured to cause the performance indicator to be within the threshold range of the performance metric.

As further shown in FIG. 6, process 600 may include causing a network slice orchestrator to update an instantiation of the network slice according to the slice modification and the network slice template (block 660). For example, the slice QoS manager (e.g., using processor 520, memory 530, storage component 540, input component 550, output component 560, communication interface 570, and/or the like) may cause a network slice orchestrator to update an instantiation of the network slice according to the slice modification and the network slice template, as described above.

Process 600 may include additional implementations, such as any single implementation or any combination of implementations described below and/or in connection with one or more other processes described elsewhere herein.

In some implementations, process 600 includes preconfiguring the network slice template to permit the network slice to provide the service via a particular configuration of resources of the network.

In some implementations, the performance information identifies at least one of: a key performance indicator associated with the network slice providing the service, or a key quality indicator associated with the network slice providing the service.

In some implementations, monitoring the performance of the network slice comprises: identifying, from the network slice orchestrator, a network resource allocation of the instantiation of the network slice, identifying a resource configuration of the network slice template, and determining the performance of the network slice based on whether the network resource allocation matches the resource configuration.

In some implementations, determining the slice modification comprises: accessing a network resource inventory of the network, the network resource inventory identifies available resources of the network, and selecting a resource, identified in the network resource inventory, that is to be included in the instantiation to cause the performance indicator to be within the threshold range.

In some implementations, determining the slice modification comprises: identifying a network resource allocation of the network slice, and selecting a resource of the network resource allocation that is to be removed from the network resource allocation to cause the performance indicator to be within the threshold range.

In some implementations, causing the network slice orchestrator to update the instantiation comprises at least one of: providing resource information associated with available resources that are to be included in the instantiation, or indicating, via a notification, that a resource of the instantiation is to be removed from the instantiation.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
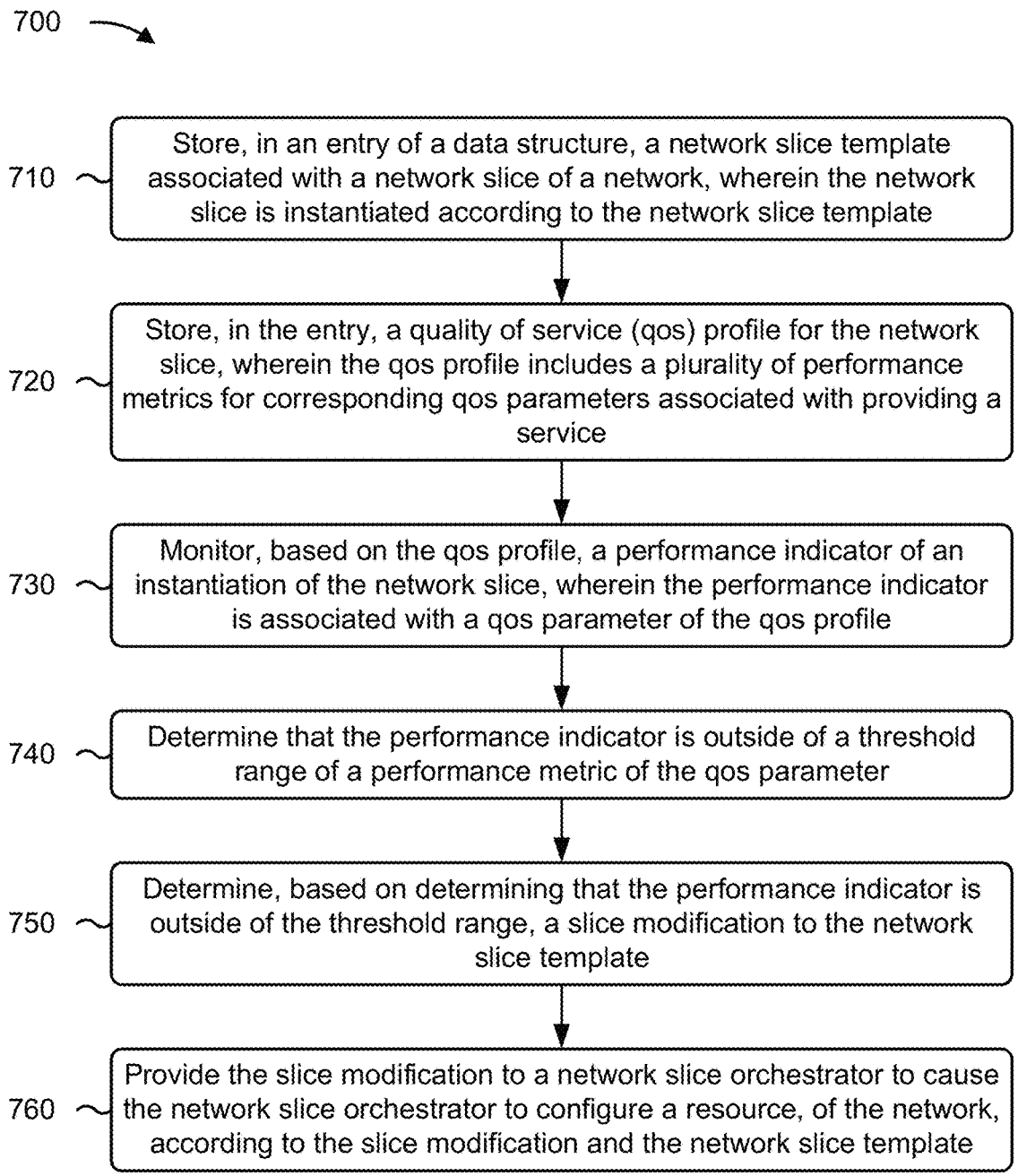

FIG. 7 is a flow chart of an example process 700 associated with quality of service management for network slices of a network. In some implementations, one or more process blocks of FIG. 7 may be performed by a slice QoS manager (e.g., slice QoS manager 310). In some implementations, one or more process blocks of FIG. 7 may be performed by another device or a group of devices separate from or including the slice QoS manager, such as a slice orchestrator (e.g., slice orchestrator 320), a slice management system (e.g., slice management system 330), a UE (e.g., UE 340), a base station (e.g., base station 352), and/or the like.

As shown in FIG. 7, process 700 may include storing, in an entry of a data structure, a network slice template associated with a network slice of a network, wherein the network slice is instantiated according to the network slice template (block 710). For example, the slice QoS manager (e.g., using processor 520, memory 530, storage component 540, input component 550, output component 560, communication interface 570, and/or the like) may store, in an entry of a data structure, a network slice template associated with a network slice of a network, as described above. In some implementations, the network slice is instantiated according to the network slice template.

As further shown in FIG. 7, process 700 may include storing, in the entry, a quality of service (QoS) profile for the network slice, wherein the QoS profile includes a plurality of performance metrics for corresponding QoS parameters associated with providing a service (block 720). For example, the slice QoS manager (e.g., using processor 520, memory 530, storage component 540, input component 550, output component 560, communication interface 570, and/or the like) may store, in the entry, a QoS profile for the network slice, as described above. In some implementations, the QoS profile includes a plurality of performance metrics for corresponding QoS parameters associated with providing a service.

As further shown in FIG. 7, process 700 may include monitoring, based on the QoS profile, a performance indicator of an instantiation of the network slice, wherein the performance indicator is associated with a QoS parameter of the QoS profile (block 730). For example, the slice QoS manager (e.g., using processor 520, memory 530, storage component 540, input component 550, output component 560, communication interface 570, and/or the like) may monitor, based on the QoS profile, a performance indicator of an instantiation of the network slice, as described above. In some implementations, the performance indicator is associated with a QoS parameter of the QoS profile.

As further shown in FIG. 7, process 700 may include determining that the performance indicator is outside of a threshold range of a performance metric of the QoS parameter (block 740). For example, the slice QoS manager (e.g., using processor 520, memory 530, storage component 540, input component 550, output component 560, communication interface 570, and/or the like) may determine that the performance indicator is outside of a threshold range of a performance metric of the QoS parameter, as described above.

As further shown in FIG. 7, process 700 may include determining, based on determining that the performance indicator is outside of the threshold range, a slice modification to the network slice template (block 750). For example, the slice QoS manager (e.g., using processor 520, memory 530, storage component 540, input component 550, output component 560, communication interface 570, and/or the like) may determine, based on determining that the performance indicator is outside of the threshold range, a slice modification to the network slice template, as described above.

As further shown in FIG. 7, process 700 may include providing the slice modification to a network slice orchestrator to cause the network slice orchestrator to configure a resource, of the network, according to the slice modification and the network slice template (block 760). For example, the service (e.g., using processor 520, memory 530, storage component 540, input component 550, output component 560, communication interface 570, and/or the like) may provide the slice modification to a network slice orchestrator to cause the network slice orchestrator to configure a resource, of the network, according to the slice modification and the network slice template, as described above.

Process 700 may include additional implementations, such as any single implementation or any combination of implementations described below and/or in connection with one or more other processes described elsewhere herein.

In some implementations, the QoS profile is associated with at least one of: an ultra-reliable, low-latency communication service, an enhanced-mobile broadband communication service, or a massive machine type communication service.

In some implementations, the QoS parameter comprises at least one of: bandwidth for providing the service, an end-to-end latency for providing the service, a packet-loss rate associated with providing the service, an availability to provide the service, a minimum throughput for providing the service, a maximum throughput for providing the service, or a coverage area in which the service is to be provided.

In some implementations, process 700 includes updating the entry to include information identifying the slice modification.

In some implementations, process 700 includes access a network resource inventory of the network, wherein the network resource inventory is indicating that the resource is available; and determining a configuration of the resource that is associated with adding the resource to the instantiation to cause the performance indicator to be within the threshold range, wherein the slice modification is being determined based on the configuration of the resource.

In some implementations, process 700 includes identifying that the resource is utilized within a network resource allocation of the network slice; and determining a configuration of the resource that is associated with the resource being removed from the instantiation to cause the performance indicator to be within the threshold range, wherein the slice modification is being determined based on the configuration of the resource.

In some implementations, the one or more processors, when providing the slice modification, are configured to at least one of: provide resource information associated with configuring the resource, or indicate, via a notification, that the resource is to be removed from the instantiation.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
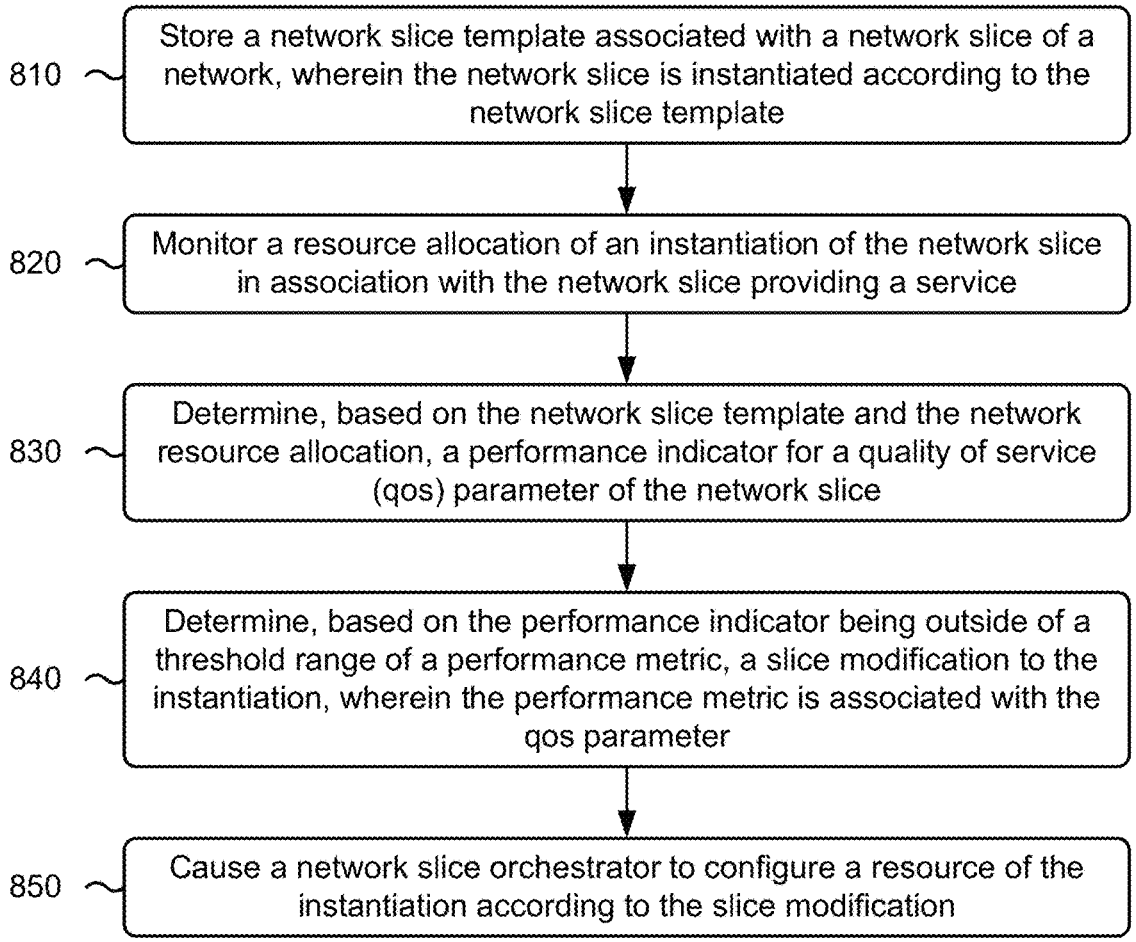

FIG. 8 is a flow chart of an example process 800 associated with quality of service management for network slices of a network. In some implementations, one or more process blocks of FIG. 8 may be performed by a slice QoS manager (e.g., slice QoS manager 310. In some implementations, one or more process blocks of FIG. 8 may be performed by another device or a group of devices separate from or including the slice QoS manager, such as a slice orchestrator (e.g., slice orchestrator 320), a slice management system (e.g., slice management system 330), a UE (e.g., UE 340), a base station (e.g., base station 352), and/or the like.

As shown in FIG. 8, process 800 may include storing a network slice template associated with a network slice of a network, wherein the network slice is instantiated according to the network slice template (block 810). For example, the slice QoS manager (e.g., using processor 520, memory 530, storage component 540, input component 550, output component 560, communication interface 570, and/or the like) may store a network slice template associated with a network slice of a network, as described above. In some implementations, the network slice is instantiated according to the network slice template.

As further shown in FIG. 8, process 800 may include monitoring a resource allocation of an instantiation of the network slice in association with the network slice providing a service (block 820). For example, the slice QoS manager (e.g., using processor 520, memory 530, storage component 540, input component 550, output component 560, communication interface 570, and/or the like) may monitor a resource allocation of an instantiation of the network slice in association with the network slice providing a service, as described above.

As further shown in FIG. 8, process 800 may include determining, based on the network slice template and the network resource allocation, a performance indicator for a quality of service (QoS) parameter of the network slice (block 830). For example, the slice QoS manager (e.g., using processor 520, memory 530, storage component 540, input component 550, output component 560, communication interface 570, and/or the like) may determine, based on the network slice template and the network resource allocation, a performance indicator for a QoS parameter of the network slice, as described above.

As further shown in FIG. 8, process 800 may include determining, based on the performance indicator being outside of a threshold range of a performance metric, a slice modification to the instantiation, wherein the performance metric is associated with the QoS parameter (block 840). For example, the service (e.g., using processor 520, memory 530, storage component 540, input component 550, output component 560, communication interface 570, and/or the like) may determine, based on the performance indicator being outside of a threshold range of a performance metric, a slice modification to the instantiation, as described above. In some implementations, the performance metric is associated with the QoS parameter.

As further shown in FIG. 8, process 800 may include causing a network slice orchestrator to configure a resource of the instantiation according to the slice modification (block 850). For example, the slice QoS manager (e.g., using processor 520, memory 530, storage component 540, input component 550, output component 560, communication interface 570, and/or the like) may cause a network slice orchestrator to configure a resource of the instantiation according to the slice modification, as described above.

Process 800 may include additional implementations, such as any single implementation or any combination of implementations described below and/or in connection with one or more other processes described elsewhere herein.

In some implementations, the network slice template and the performance metric of the QoS parameter are received from an operation support system and business support system (OS S/BS S) of the network.

In some implementations, process 800 includes determining that the network resource allocation involves a smaller quantity of resources than a configuration of resources associated with the network slice template; identifying, based on a network resource inventory, that the resource is available to improve the performance indicator; and determining a configuration of the resource associated with adding the resource to the instantiation to cause the performance indicator to be within the threshold range, wherein the slice modification is being determined based on the configuration of the resource.

In some implementations, process 800 includes determining that the network resource allocation involves a larger quantity of resources than a configuration of resources associated with the network slice template; and determining a configuration of the resource associated with removing the resource from the instantiation to cause the performance indicator to be within the threshold range, wherein the slice modification is being determined based on the configuration of the resource.

In some implementations, the one or more instructions, that cause the one or more processors to cause the network slice orchestrator to configure the resource, cause the one or more processors to at least one of: provide resource information associated with configuring the resource, or indicate, via a notification, that the resource is to be removed from the instantiation.

In some implementations, the network slice template is stored in an entry of a data structure, and modify the entry to identify the slice modification in association with the network slice template.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device, information identifying a network slice template associated with a network slice of a network,
        wherein the network slice template indicates how to instantiate the network slice, and
        wherein the network slice is instantiated according to the network slice template;
    determining, by the device and from the network slice template, a quality of service (QoS) profile for the network slice, wherein the QoS profile includes a set of performance metrics for providing a service;
    monitoring, by the device, performance of the network slice in association with the QoS profile;
    storing, by the device, based on monitoring the performance of the network slice, and in in a real-time slice information table stored by the device, the network slice template and a set of performance indicators;
    identifying, by the device, based on monitoring the performance of the network slice, and in an expected QoS data table stored by the device, the network slice template and a set of QoS parameters assigned to the set of performance metrics;
    determining, by the device and based on comparing a performance indicator, of the set of performance indicators, to a corresponding performance metric of the set of corresponding performance metrics, that the performance indicator is outside of a threshold range of the corresponding performance metric;
    determining, by the device and based on determining that the performance indicator is outside of the threshold range, a slice modification to the network slice, wherein the slice modification is configured to cause the performance indicator to be within the threshold range of the performance metric; and
    causing, by the device, a network slice orchestrator to update an instantiation of the network slice according to the slice modification and the network slice template.

2. The method of claim 1, further comprising preconfiguring of the network slice template to permit the network slice to provide the service via a particular configuration of resources of the network.

3. The method of claim 2, wherein the performance indicator comprises at least one of:
    a key performance indicator associated with the network slice providing the service, or
    a key quality indicator associated with the network slice providing the service.

4. The method of claim 1, wherein monitoring the performance of the network slice comprises:
  identifying, from the network slice orchestrator, a network resource allocation of the instantiation of the network slice;
  identifying a resource configuration of the network slice template; and
  determining the performance of the network slice based on whether the network resource allocation matches the resource configuration.

5. The method of claim 1, wherein determining the slice modification comprises:
  accessing a network resource inventory of the network, wherein the network resource inventory identifies available resources of the network; and
  selecting a resource, identified in the network resource inventory, that is to be included in the instantiation to cause the performance indicator to be within the threshold range.

6. The method of claim 1, wherein determining the slice modification comprises:
  identifying a network resource allocation of the network slice; and
  selecting a resource of the network resource allocation that is to be removed from the network resource allocation to cause the performance indicator to be within the threshold range.

7. The method of claim 1, wherein causing the network slice orchestrator to update the instantiation comprises at least one of:
  providing resource information associated with available resources that are to be included in the instantiation, or
  indicating, via a notification, that a resource of the instantiation is to be removed from the instantiation.

8. A device, comprising:
  one or more memories; and
  one or more processors, coupled to the one or more memories, configured to:
    receive information identifying a network slice template associated with a network slice of a network,
      wherein the network slice template indicates how to instantiate the network slice, and
      wherein the network slice is instantiated according to the network slice template;
    determine, and from the network slice template, a quality of service (QoS) profile for the network slice, wherein the QoS profile includes a set of performance metrics for providing a service;
    monitor performance of the network slice in association with the QoS profile;
    store, based on monitoring the performance of the network slice and in a real-time slice information table stored by the device, a set of performance indicates and the network slice template;
    identify, based on monitoring the performance of the network slice and in an expected QoS data table stored by the device, the network slice template a set of QoS parameters assigned to the set of performance metrics;
    determine, based on comparing a performance indicator, of the set of performance indicators, to a corresponding performance metric of the set of corresponding performance metrics, that the performance indicator is outside of a threshold range of the corresponding performance metric;
    determine, based on determining that the performance indicator is outside of the threshold range, a slice modification to the network slice; and
    provide the slice modification to a network slice orchestrator to cause the network slice orchestrator to configure a resource, of the network, according to the slice modification and the network slice template.

9. The device of claim 8, wherein the QoS profile is associated with at least one of:
  an ultra-reliable, low-latency communication service,
  an enhanced-mobile broadband communication service, or
  a massive machine type communication service.

10. The device of claim 8, wherein the QoS parameter comprises at least one of:
  bandwidth for providing the service,
  an end-to-end latency for providing the service,
  a packet-loss rate associated with providing the service,
  an availability to provide the service,
  a minimum throughput for providing the service,
  a maximum throughput for providing the service, or
  a coverage area in which the service is to be provided.

11. The device of claim 8, wherein the one or more processors are further configured to:
  update an entry of the expected QoS data table to include information identifying the slice modification.

12. The device of claim 8, wherein the one or more processors, to determine the slice modification, are configured to:
  access a network resource inventory of the network,
    wherein the network resource inventory indicates that the resource is available; and
  determine a configuration of the resource that is associated with adding the resource to the instantiation to cause the performance indicator to be within the threshold range,
    wherein the slice modification is determined based on the configuration of the resource.

13. The device of claim 8, wherein the one or more processors, to determine the slice modification, are configured to:
  identify that the resource is utilized within a network resource allocation of the network slice; and
  determine a configuration of the resource that is associated with the resource being removed from the instantiation to cause the performance indicator to be within the threshold range,
    wherein the slice modification is determined based on the configuration of the resource.

14. The device of claim 8, wherein the one or more processors, to provide the slice modification, are configured to at least one of:
  provide resource information associated with configuring the resource, or
  indicate, via a notification, that the resource is to be removed from the instantiation.

15. A non-transitory computer-readable medium storing instructions, the instructions comprising:
  one or more instructions that, when executed by one or more processors of a device, cause the one or more processors to:
    receive information identifying a network slice template associated with a network slice of a network,
      the network slice template indicates how to instantiate the network slice, and
      wherein the network slice is instantiated according to the network slice template;

determine, from the network slice template, a quality of service (QoS) profile for the network slice, wherein the QoS profile includes a set of performance metrics for providing a service;

monitor performance of the network slice in association with the QoS Profile;

store, based on monitoring the performance of the network slice and in a real-time slice information table stored by the device, the network slice template and a set of performance indicators;

identify, based on monitoring the performance of the network slice and in an expected QoS data table stored by the device, the network slice template and a set of QoS parameters assigned to the set of performance metrics;

determine, based on comparing a performance indicator, of the set of performance indicators, to a corresponding performance metric of the set of corresponding performance metrics, that the performance indicator is outside of a threshold range of the corresponding performance metric;

determine, based on the performance indicator being outside of a threshold range of the performance metric, a slice modification to the instantiation; and cause a network slice orchestrator to configure a resource of the instantiation according to the slice modification.

16. The non-transitory computer-readable medium of claim 15, wherein the one or more instructions, that cause the one or more processors to receive information identifying the network slice template, further cause the one or more processors to:

receive a copy of the network slice template and the set of performance metrics from an operation support system and business support system (OSS/BSS) of the network.

17. The non-transitory computer-readable medium of claim 15, wherein the one or more instructions, that cause the one or more processors to determine the slice modification, cause the one or more processors to:

determine that a network resource allocation of the network slice involves a smaller quantity of resources than a configuration of resources associated with the network slice template;

identify, based on a network resource inventory, that the resource is available to improve the performance indicator; and determine a configuration of the resource associated with adding the resource to the instantiation to cause the performance indicator to be within the threshold range, wherein the slice modification is determined based on the configuration of the resource.

18. The non-transitory computer-readable medium of claim 15, wherein the one or more instructions, that cause the one or more processors to determine the slice modification, cause the one or more processors to:

determine that a network resource allocation of the network slice involves a larger quantity of resources than a configuration of resources associated with the network slice template; and determine a configuration of the resource associated with removing the resource from the instantiation to cause the performance indicator to be within the threshold range,
wherein the slice modification is determined based on the configuration of the resource.

19. The non-transitory computer-readable medium of claim 15, wherein the one or more instructions, that cause the one or more processors to cause the network slice orchestrator to configure the resource, cause the one or more processors to at least one of:

provide resource information associated with configuring the resource, or indicate, via a notification, that the resource is to be removed from the instantiation.

20. The non-transitory computer-readable medium of claim 15, wherein the expected QoS data table is maintained in a data structure, and wherein the one or more instructions, when executed, further cause the one or more processors to:

modify an entry of the expected QoS data table to identify the slice modification in association with the network slice template.

* * * * *